United States Patent [19]

Llopis

[11] Patent Number: 4,684,857
[45] Date of Patent: Aug. 4, 1987

[54] OPTICAL EXCITATION ELECTROMAGNETIC MOTOR
[76] Inventor: Miguel C. Llopis, C/Dolores Piera, 5 - Benisa (Alicante), Spain
[21] Appl. No.: 691,449
[22] Filed: Jan. 14, 1985
[30] Foreign Application Priority Data Jan. 24, 1984 [ES] Spain ................................. 529123
[51] Int. Cl.$^4$ .......................................... H02K 29/00
[52] U.S. Cl. .................... 318/313; 318/326; 318/138; 318/254; 318/439; 250/233; 250/231 SE
[58] Field of Search ............... 318/138, 139, 244, 245, 318/254, 257, 311, 312, 313, 314, 316, 317, 318, 320, 326, 327, 341, 345, 328, 439, 463, 599, 603, 605, 615, 616, 617, 618, 628, 640, 696; 324/160–166; 250/231 SE, 233, 236

[56] References Cited

U.S. PATENT DOCUMENTS

| | | | |
|---|---|---|---|
| 2,892,124 | 6/1959 | Rabinow | 250/233 X |
| 2,968,756 | 1/1961 | Devol | 318/254 |
| 3,135,903 | 6/1964 | Tomek | 318/640 |
| 3,193,744 | 7/1965 | Seward | 250/233 X |
| 3,281,634 | 10/1966 | Studer | 318/318 X |
| 3,348,050 | 10/1967 | Bez | 250/233 X |
| 3,353,076 | 11/1967 | Haines | 318/254 X |
| 3,374,410 | 3/1968 | Cronquist et al. | 318/254 |
| 3,388,303 | 6/1968 | Rommel | 318/640 X |
| 3,414,790 | 12/1968 | Auld | 318/345 B X |
| 3,500,050 | 3/1970 | Hillman | 250/233 X |
| 3,514,685 | 5/1970 | Burgess | 318/313 |
| 3,564,370 | 2/1971 | Catherin | 318/439 X |
| 3,590,355 | 6/1971 | Davis | 318/614 X |
| 3,594,624 | 7/1971 | Lueder | 318/439 X |
| 3,634,776 | 1/1972 | Bell | 318/313 X |
| 3,667,018 | 5/1972 | Rakes | 318/439 X |
| 3,740,633 | 6/1973 | Buttafava | 318/328 |
| 3,766,456 | 10/1973 | Carow | 318/138 |
| 3,766,458 | 10/1973 | Nishimura et al. | 318/254 X |
| 3,886,354 | 5/1975 | Swiden et al. | 250/231 SE |
| 3,894,232 | 7/1975 | Laspesa | 250/231 SE |
| 3,946,294 | 3/1976 | Scholten | 318/313 |
| 3,946,295 | 3/1976 | Moore | 318/345 X |
| 4,008,424 | 2/1977 | Bompani | 318/327 |
| 4,072,415 | 2/1978 | Inoue et al. | 250/233 X |
| 4,079,300 | 3/1978 | Sleger | 318/326 |
| 4,103,214 | 7/1978 | Braitberg | 318/326 |
| 4,289,983 | 9/1981 | Bengnar et al. | 318/254 X |
| 4,320,330 | 3/1982 | Bahr et al. | 318/254 X |
| 4,347,464 | 8/1982 | Park et al. | 318/439 X |
| 4,360,769 | 11/1982 | Selkey et al. | 318/603 X |
| 4,361,789 | 11/1981 | Faulhaber | 318/439 X |
| 4,379,255 | 4/1983 | Klose et al. | 318/313 |
| 4,409,530 | 10/1983 | Neeper et al. | 318/254 X |
| 4,430,603 | 2/1984 | Müller | 318/439 X |
| 4,459,523 | 7/1984 | Evans et al. | 318/313 X |
| 4,465,959 | 8/1984 | Yajima | 318/696 |
| 4,528,448 | 7/1985 | Doggett | 250/231 SE |
| 4,536,649 | 8/1985 | Kozai et al. | 250/231 SE |

Primary Examiner—William M. Shoop, Jr.
Assistant Examiner—Shik Luen Paul Ip
Attorney, Agent, or Firm—McGlew and Tuttle

[57] ABSTRACT

An optical excitation electromagnet brushless motor comprises a stator having at least two angularly separated stator coils; a transistorized amplifier connected to the stator coils and connectable to a power source for exciting the stator coils when the amplifier is activated; a rotor rotatably mounted about an axis with respect to the stator and carrying at least two angularly spaced rotor magnets each for generating a permanent magnetic field for interaction with magnetic fields generated by the stator coils when energized by the amplifier to cause rotation of the rotor about the axis; a disc mounted for rotation with the rotor and having at least one port therein extending radially on the disc with respect to the axis and rotatable about the axis, the port being at a selected angular position with respect to the rotor magnets; an arm mounted for radial movement with respect to the disc; a light transmitter and a light receiver mounted on the arm on opposite sides of the disc for the passage of light from the transmitter to the receiver through the port when the port passes between the light transmitter and light receiver, the light receiver being connected to the transistorized amplifier for energizing the transistorized amplifier when receiving light from the light transmitter through the port, a speed of rotation of the rotor being determined by a radial position of the arm with respect to the axis and a direction of rotation of the rotor being determined by an angular position of the port with respect to the rotor magnets.

5 Claims, 2 Drawing Figures

OPTICAL EXCITATION ELECTROMAGNETIC MOTOR

FIELD AND BACKGROUND OF THE INVENTION

The present invention refers to an electromagnetic motor comprising amongst its constitutive elements, photodiodes, a photocell or a phototransistor, and a light beam, whether a LED diode, an infrared diode or an incandescent lamp, in combination with magnetic and/or electromagnetic elements, by means of which the turning of a shaft from which mechanical energy must be extracted, is achieved.

SUMMARY OF THE INVENTION

The motor of the present invention, when compared with any of the known motors, is highly advantageous since it completely eliminates fraction produced by the collector and the brushes, and the wear too caused by said friction, as well as the radioelectric interferences due to sparks, finally presenting the also important advantage of not requiring maintenance.

The philosophy of the present motor is that of utilising the force of facing magnetic fields having different polarities to cause the shaft to turn.

As in the case of all electric motors, the motor of this invention requires a rotor and a stator.

The rotor comprises a variable number of magnetic or electromagnetic elements (fixed magnetic field) aligned in a circle.

The stator comprises a variable number of electromagnetic elements, the polarity of which is opposite to the magnetic elements of the rotor, disposed about said rotor with a suitable separation therefrom.

The support of the elements constituting the rotor, or in lieu thereof a disc or wheel mounted on the motor shaft, comprises one or more ports through which a light beam is made to pass to a photocell or the like which causes, after it has passed through a transistorized amplifier connected to a power source, the electromagnetic elements of the stator to be excited, repelling the magnetic elements of the rotor having an opposite polarity, so that the turning thereof is caused.

Naturally, this embodiment can be varied since the aforegoing is merely the most elementary practical mode of the invention. The advance of the electronic techniques will permit higher yields, both in the manufacture of this type of motor, and in the industrial application thereof, to be achieved.

The drawings accompanying this specification illustrate, by way of example, a scheme of this practical embodiment.

DESCRIPTION OF THE PREFERRED EMBODIMENTS

Figure 1:
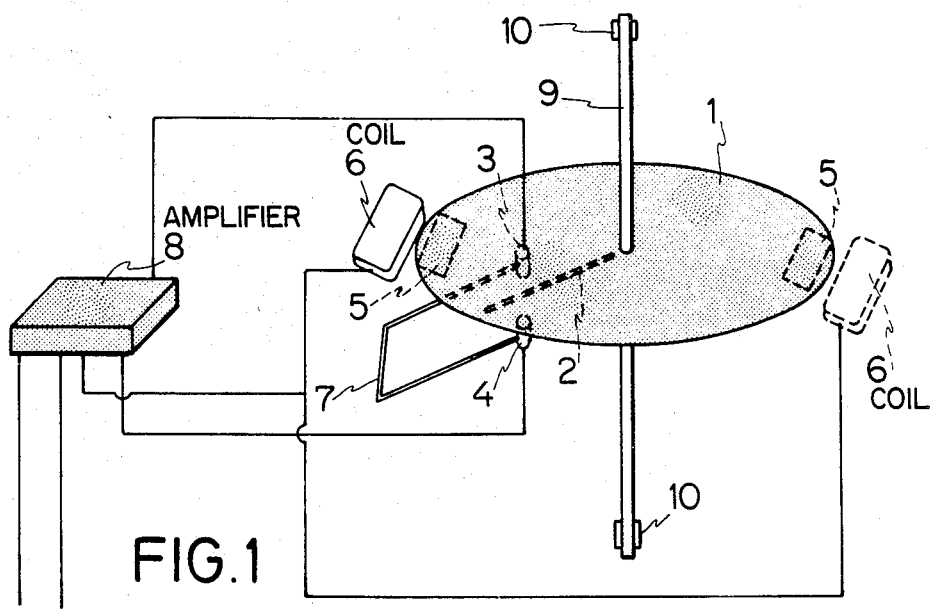
FIG. 1 is a schematic perspective view of one embodiment of the invention.

The numerical references of the drawings correspond to the following elements:

1. Disc or wheel of the rotor
2. Port or ports made in the disc
3. LED (light beam)
4. Phototransistor or the like
5. Magnets (or electromagnets) of the rotor
6. Electromagnetic coils comprising the stator
7. Support guide of the LED 3 and phototransistor 4
8. Electronic amplifier-exciter, connected to a power source
9. Rotor shaft
10. Support bearings of the shaft 9.

FIG. 1 of the mentioned drawings illustrates an elementary scheme of a practical mode of embodiment in which the magnetic elements of the rotor are incorporated in the disc-wheel of the rotor.

Figure 2:
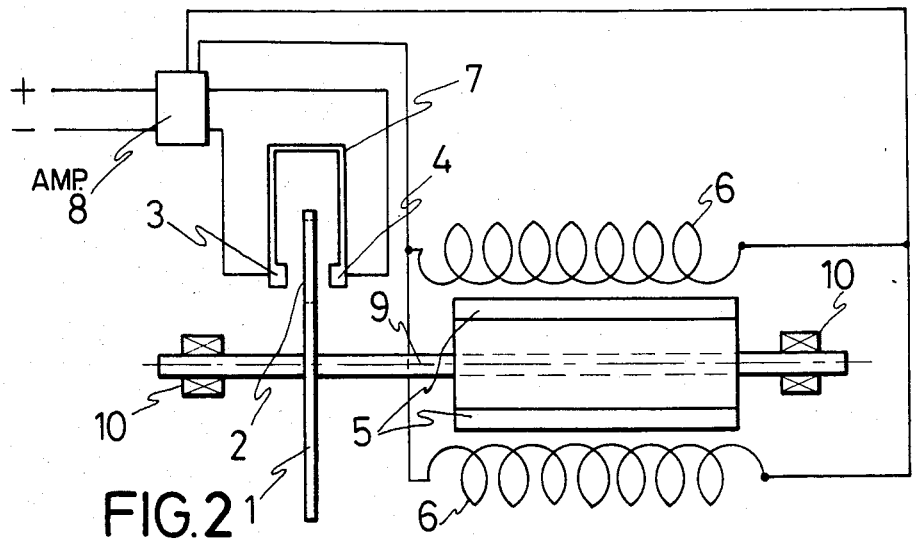
FIG. 2 is a side elevational view of another embodiment of the invention.

FIG. 2 represents a different mode of embodiment, similar to a conventional electric motor.

It must be pointed out that the collector and the conventional brushes have been eliminated from the motor of the present invention and have been replaced by the optoelectromagnetic elements.

Differing from conventional electric motors, the permanent magnets or electromagnets are incorporated on the rotor and the stator is provided with the coils which create the possible magnetic field, when they are excited by the photocell, causing the rotor to turn.

In accordance with the figures, functioning of the motor is as follows:

When the disc-wheel of the rotor 1 is provided with an undetermined number of ports 2 passing therethrough, an LED diode 3 (or an infrared diode or merely an incandescent lamp) is placed in front of it and a photodiode, phototransistor or photocell 4 for receiving the luminous radiation emitted by 3 is placed opposite it.

When the phototransistor or the like 4 is illuminated by the light beam 3, after it has passed through the electronic amplifier-exciter 8, it excites the electromagnetic coils 6 of the stator, which coils create the magnetic field necessary for the rotor to initiate its turn, since the pole of this magnetic field differs from that of the rotor.

This rotor, during its turn, controls its speed since each time it faces, through the port, the light beam and the phototransistor, it will send a current to excite the coils of the stator, until the turning itself blocks the light passage. The inertia of the turning of the rotor will produce the same effect each time light passes through the port. The cycles are accumulated until a constant speed is obtained.

The arrangement of the elements forming the motor, repeated in variable numbers, will increase or reduce the power.

The radial arrangement of the ports permits the relative position of the light beam and the photocell with respect to the rotor shaft to be adjusted, to obtain different turning speeds.

The magnetic elements constituting a part of the rotor could be directed in the same pole (positive or negative) or mixed, positive-negative alternately. The final effect will be the same in any case.

The electrical energy consumption is practically nil since it is operated by the pulses produced by the temporary excitation of the stator coils, each time the photocell is actuated by the light beam, the excitation being interrupted until a new cycle is initiated. Support guide 7 is in the form of an arm which can be moved radially with respect to the shaft 9 to adjust the radial position of light transmitting and receiving elements 3,4, with respect to the radially extending port 2. By radially moving arm 7 the rotational speed of the motor can thus be changed. The motor is of the brushless kind since the magnetic fields of the magnets or coils 5 of the rotor are fixed while varying magnetic fields are applied to the stator coils 6. No brushes are thus needed to connect the stator coils 6 to the electronic amplifier-exciter 8. Further, since the radial position of the rotor magnets (or electromagnets) 5 is fixed with respect to the port 2, if arm 7 is moved to different radial positions around the disc or wheel 1, the direction of rotation for the motor can be reversed.

I claim:

1. An optical excitation electromagnet brushless motor comprising a stator having at least two angularly separated stator coils; a transistorized amplifier connected to said stator coils and connectable to a power source for exciting said stator coils when said amplifier is activated; a rotor rotatably mounted about an axis with respect to said stator and carrying at least two angularly spaced rotor magnets each for generating a permanent magnetic field for interaction with magnetic fields generated by said stator coils when energized by said amplifier to cause rotation of said rotor about said axis, a disc mounted for rotation with said rotor and having a radially extending port therein extending radially on said disc with respect to said axis and rotatable about said axis, said port being at a selected angular position with respect to said rotor magnets; an arm mounted for radial movement with respect to said disc, to any radial location along the radial extent of said port; a light transmitter and a light receiver mounted on said arm on opposite sides of said disc for the passage of light from said transmitter to said receiver through said port when said port passes between said light transmitter and light receiver, said light receiver being connected to said transistorized amplifier for energizing said transistorized amplifier when receiving light from said light transmitter through said port, a speed of rotation of said rotor being determined by a radial position of said arm with respect to said axis and a direction of rotation of said rotor being determined by an angular position of said port with respect to said rotor magnets.

2. A motor according to claim 1, wherein said stator coils extend axially parallel to said axis of rotation for said rotor for producing an axially parallel magnetic field, said rotor magnets extending axially parallel to said rotor axis.

3. A motor according to claim 2, wherein said rotor magnets comprise electromagnetic rotor coils which are supplied by constant electricity to produce a constant magnetic field.

4. A motor according to claim 3, wherein said rotor coils are mounted in said disc.

5. A motor according to claim 3, including a shaft mounted for rotation on said axis, said rotor with said rotor coils being mounted on said shaft and said disc being mounted at an axially spaced position from said rotor and on said shaft.

* * * * *